US008279210B2

(12) United States Patent
Im et al.

(10) Patent No.: US 8,279,210 B2
(45) Date of Patent: Oct. 2, 2012

(54) DISPLAY APPARATUS AND METHOD OF DRIVING THE SAME

(75) Inventors: Chang-Jin Im, Hwaseong-si (KR); Moon-Chul Park, Seoul (KR); Sang-Jae Yeo, Hwaseong-si (KR)

(73) Assignee: Samsung Display Co., Ltd., Yongin (KR)

( * ) Notice: Subject to any disclaimer, the term of this patent is extended or adjusted under 35 U.S.C. 154(b) by 912 days.

(21) Appl. No.: 12/365,347

(22) Filed: Feb. 4, 2009

(65) Prior Publication Data

US 2010/0053138 A1 Mar. 4, 2010

(30) Foreign Application Priority Data

Sep. 3, 2008 (KR) ........................ 10-2008-0086968

(51) Int. Cl.
*G06F 3/038* (2006.01)
*G09G 5/00* (2006.01)

(52) U.S. Cl. .......... 345/211; 345/98; 345/100; 345/209; 345/212

(58) Field of Classification Search ........................ None
See application file for complete search history.

(56) References Cited

U.S. PATENT DOCUMENTS

| | | | | |
|---|---|---|---|---|
| 5,648,793 | A * | 7/1997 | Chen | 345/96 |
| 5,825,343 | A * | 10/1998 | Moon | 345/94 |
| 5,923,310 | A * | 7/1999 | Kim | 345/90 |
| 6,753,835 | B1 * | 6/2004 | Sakai | 345/87 |
| 7,034,789 | B2 * | 4/2006 | Takeuchi et al. | 345/90 |
| 7,375,718 | B2 * | 5/2008 | Kim | 345/100 |
| 7,391,414 | B2 * | 6/2008 | Wakimoto et al. | 345/209 |
| 7,825,888 | B2 * | 11/2010 | Tobita et al. | 345/100 |
| 2008/0036934 | A1 * | 2/2008 | Um et al. | 349/38 |
| 2008/0309601 | A1 * | 12/2008 | Furukoshi | 345/89 |

FOREIGN PATENT DOCUMENTS

| | | |
|---|---|---|
| JP | 2007-212916 | 8/2007 |
| KR | 10-2001-0047215 | 6/2001 |
| KR | 10-2007-0067969 | 6/2007 |

* cited by examiner

*Primary Examiner* — William Boddie
*Assistant Examiner* — Christopher Thompson
(74) *Attorney, Agent, or Firm* — H. C. Park & Associates, PLC

(57) ABSTRACT

In a display apparatus and a method of driving the display apparatus, data voltages, which correspond to image data, are supplied to data lines to drive a plurality of pixels arranged in pixel areas defined by a plurality of gate lines and data lines, and gate signals are sequentially supplied to gate lines. The gate signals are maintained at a level of gate on voltage such that the data voltages of the data lines are supplied to corresponding pixels during a scan period, and alternately have a first voltage level and a second voltage level in synchronization with a common voltage during a non-scan period.

22 Claims, 10 Drawing Sheets

DISPLAY APPARATUS AND METHOD OF DRIVING THE SAME

CROSS REFERENCE TO RELATED APPLICATION

This application claims priority from and the benefit of Korean Patent Application No. 2008-86968, filed on Sep. 3, 2008, which is hereby incorporated by reference for all purposes as if fully set forth herein.

BACKGROUND OF THE INVENTION

1. Field of the Invention

The present invention relates to a display apparatus and a method of driving the display apparatus.

2. Discussion of the Background

In general, electronic appliances, such as a mobile communication terminal, a digital camera, a notebook computer, a monitor, and a television, include an image display apparatus to display images. Various types of image display apparatuses are extensively used. Among the image display apparatuses, a flat panel display is mainly used for electronic appliances. A representative flat panel display is a liquid crystal display (LCD).

The LCD displays an image by using liquid crystal. The LCD has a slim structure and light weight. In addition, the LCD has low power consumption and operates at low driving voltage, so that the LCD may be extensively used in various industrial fields.

SUMMARY OF THE INVENTION

The present invention provides a display apparatus that may improve the reliability of a thin film transistor.

The present invention also provides a method of driving the display apparatus.

Additional features of the invention will be set forth in the description which follows, and in part will be apparent from the description, or may be learned by practice of the invention.

The present invention discloses a display apparatus that includes a display unit, a source driver, and a gate driver. The display unit includes a plurality of pixels arranged in pixel areas defined by a plurality of gate lines and data lines to display images. The source driver supplies data voltages to the data lines, the data voltages corresponding to image data. The gate driver sequentially supplies gate signals to the gate lines. The gate signals are maintained at a level of gate on voltage such that the data voltages of the data lines are supplied to corresponding pixels during a scan period, and alternately have a first voltage level and a second voltage level during a non-scan period.

The present invention also discloses a method of driving a display apparatus. According to the method, data voltages are supplied to a plurality of data lines. Gate signals are sequentially supplied to a plurality of gate lines. Images corresponding to the data voltages are displayed in response to the gate signals.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
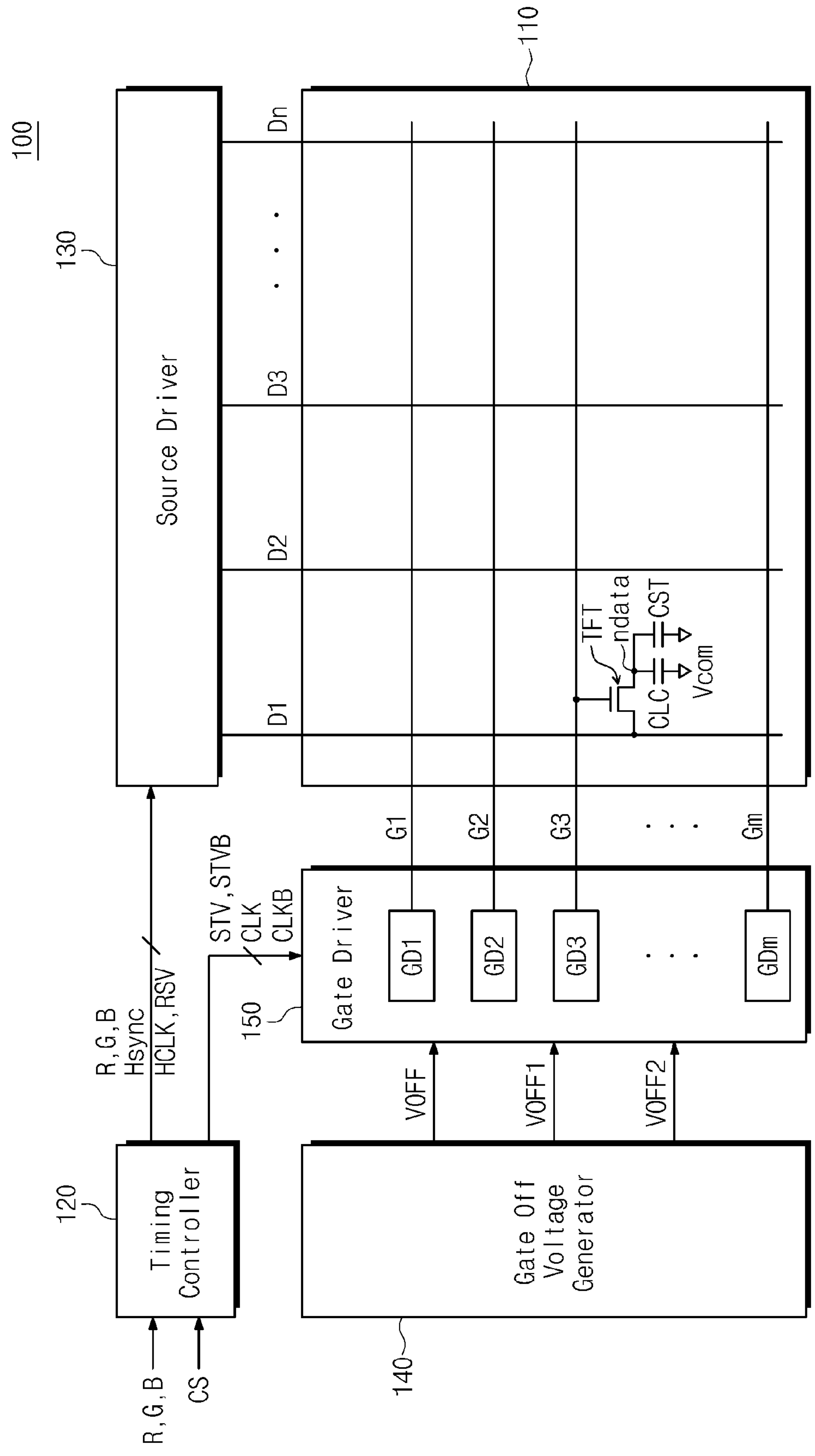
FIG. 1 is a block diagram showing an LCD according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Hereinafter, exemplary embodiments of the present invention will be explained in detail with reference to the accompanying drawings.

A liquid crystal display (LCD) according to exemplary embodiments of the present invention is driven in a line reverse drive scheme and provides gate off voltages to gate lines in synchronization with a common voltage. As a result, stress applied to a thin film transistor of the LCD may be reduced.

FIG. 1 is a block diagram showing an LCD according to an exemplary embodiment of the present invention.

Referring to FIG. 1, the LCD 100 includes a display unit 110, a timing controller 120, a source driver 130, a gate off voltage generator 140, and a gate driver 150.

The display unit 110 includes an LCD panel (not shown) having a liquid crystal layer disposed between two substrates to display images. A plurality of data lines D1 to Dn and gate lines G1 to Gm are provided on one of the two substrates. The data lines D1 to Dn cross the gate lines G1 to Gm, and the data lines and gate lines are insulated from each other. Pixels are provided in pixel areas defined by the data lines D1 to Dn and gate lines G1 to Gm. As shown in FIG. 1, each pixel includes a thin film transistor TFT, a liquid crystal capacitor CLC, and a storage capacitor CST.

The thin film transistor TFT includes a gate electrode connected to a corresponding gate line and a source electrode connected to a corresponding data line. The thin film transistor TFT receives a data voltage from the source driver 130 in response to the gate signal transferred from the gate line. The liquid crystal capacitor CLC is connected between a pixel electrode, which is connected to a drain electrode ndata of the thin film transistor TFT, and a common electrode, which receives a common voltage Vcom and faces the pixel electrode. Liquid crystal is provided in the liquid crystal capacitor CLC. Thus, light transmittance of the liquid crystal is controlled according to the data voltage, so that an image having a desired gray scale can be displayed.

The storage capacitor CST is connected to the drain electrode ndata of the thin film transistor TFT and a storage electrode. The storage electrode is configured to provide the same voltage to each pixel through a storage line (not shown).

The timing controller 120 receives digital image data signals R, G, and B and control signals CS from the exterior. Upon receiving the control signals CS, the timing controller 120 outputs control signals, such as horizontal synchronization signals Hsync, horizontal clock signals HCLK, vertical start signals STV and STVB, clock signals CLK, and clock bar signals CLKB, which are required to drive the source driver 130 and the gate driver 150.

The source driver 130 receives the image data signals R, G, and B from the timing controller 120 in synchronization with the horizontal synchronization signal Hsync and the horizontal clock signal HCLK. The source driver 130 receives image data signals R, G, and B corresponding to one gate line from the timing controller 120 and generates n data voltages to provide the n data voltages to n data lines D1 to Dn.

The timing controller 120 generates a reverse signal RSV to provide the reverse signal RSV to the source driver 130. Polarity of the data voltages is determined according to the reverse signal RSV. For instance, the polarity of the data voltages is reversed in a unit of one horizontal line according to the reverse signal RSV. Since the polarity of the common voltage Vcom is changed according to the polarity of the data voltages, the polarity of the common voltage Vcom is reversed in a unit of one horizontal line.

Figure 2:
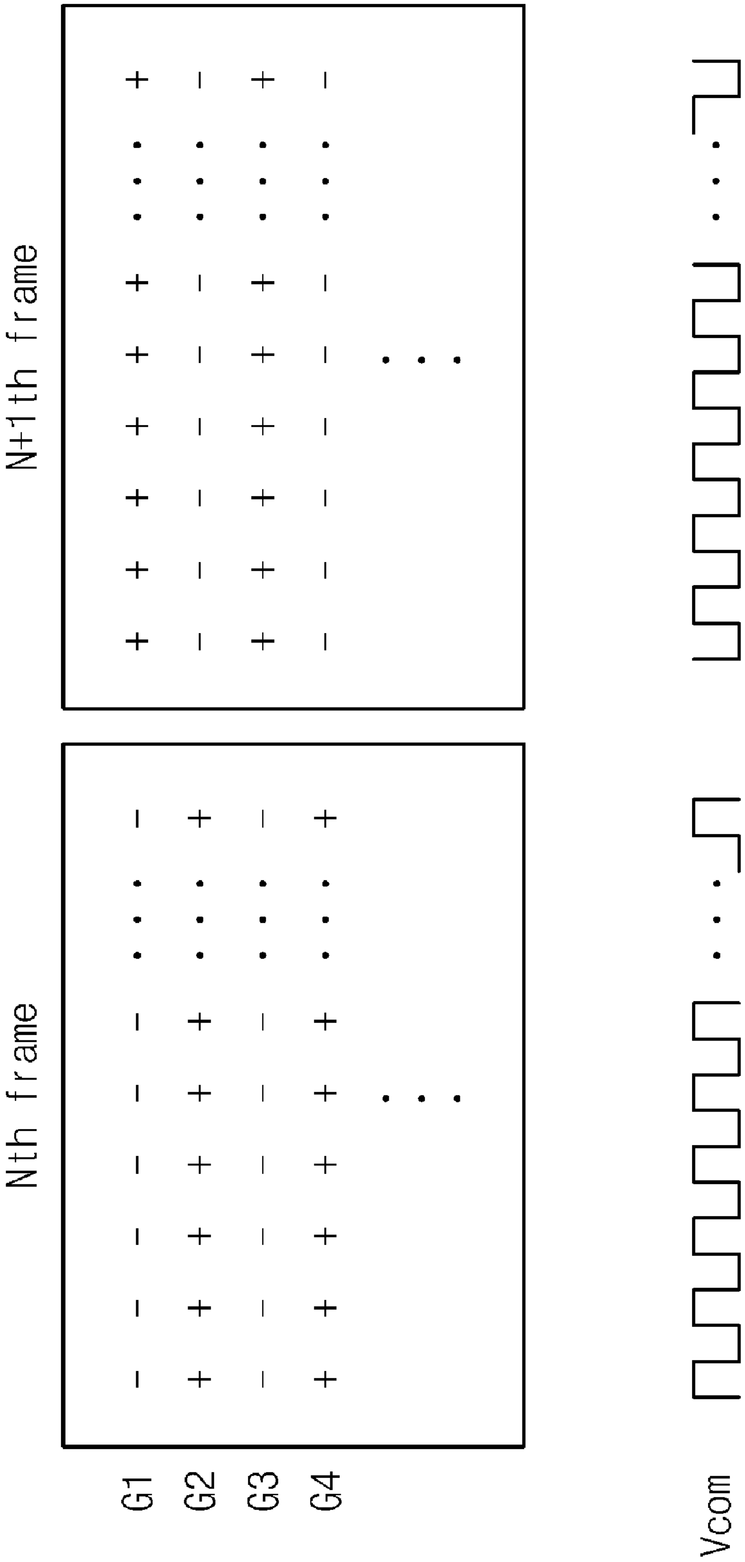
FIG. 2 is a view showing phases of an LCD operated in a line reverse drive scheme, and a common voltage.

FIG. 2 is a view showing phases of the LCD operated in a line reverse drive scheme, and a common voltage.

Referring to FIG. 2, when the LCD is operated in the line reverse drive scheme, the polarity of the common voltage Vcom is reversed whenever one gate line is scanned. For instance, in the case of an $N^{th}$ frame, negative polarity data are supplied to pixels connected to odd-numbered gate lines G1 and G3, and positive polarity data are supplied to pixels connected to even-numbered gate lines G2 and G4. When positive polarity data are supplied to the pixels, the common voltage Vcom has negative polarity. In addition, when negative polarity data are supplied to the pixels, the common voltage Vcom has positive polarity.

In the case of an $(N+1)^{th}$ frame, the polarity of the odd-numbered gate lines G1 and G3 and the even-numbered gate lines G2 and G4 is reversed from that of the $N^{th}$ frame. At this time, the polarity of the common voltage Vcom is also reversed.

Referring again to FIG. 1, the gate off voltage generator 140 generates first to third gate off voltages VOFF, VOFF1, and VOFF2. The first to third gate off voltages VOFF, VOFF1, and VOFF2 are used to maintain the pixel data and are provided to the gate driver 150.

The first gate off voltage VOFF has a voltage level lower than that of the second and third gate off voltages VOFF1 and VOFF2. The second and third gate off voltages VOFF1 and VOFF2 are swung between first and second levels VH and VL during a period, which is two times longer than a frame period. The second and third gate off voltages VOFF1 and VOFF2 have phases that are reversed to each other.

Meanwhile, the gate driver 150 includes a shift register that operates in response to the vertical start signal STV. The shift register includes a plurality of stages GD1 to GDm. The stages GD1 to GDm sequentially output gate signals having an on voltage (VON) level in response to the first and second clock signals CLK and CLKB.

Figure 3:
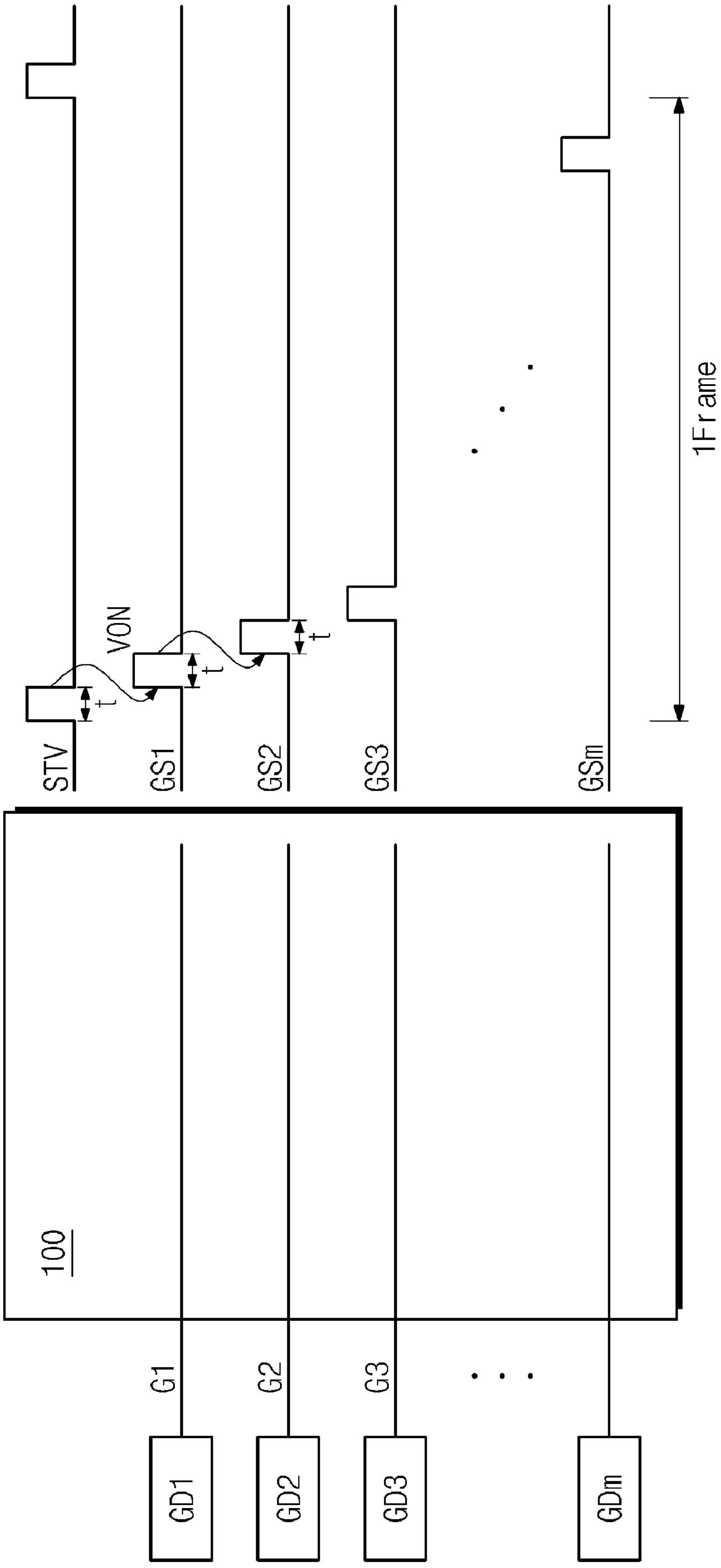
FIG. 3 is a view showing gate signals output from a gate driver.

FIG. 3 is a view showing gate signals output from the gate driver 150.

As shown in FIG. 3, the gate signals GS1 to GSm, which are sequentially output from the stages GD1 to GDm, have the gate on voltage (VON) level during the horizontal scan period (t) of one frame (1Frame), and have an off voltage level during the remaining period (hereinafter, referred to as a non-scan period).

The gate driver 150 receives the first to third gate off voltages VOFF, VOFF1, and VOFF2 to allow the gate signals GS1 to GSm to have the off voltage level in the non-scan period. The first gate off voltage VOFF is used to stabilize a node of each stage, and the second and third gate off voltages VOFF1 and VOFF2 are used to vary the off voltage level of the gate signals GS1 to GSm output from the stages GD1 to GDm.

For instance, the stages GD1 to GDm are configured to alternately output the second and third gate off voltages VOFF1 and VOFF2 in synchronization with the first and second clock signals CLK and CLKB. Since the common voltage Vcom is swung in synchronization with the first and second clock signals CLK and CLKB, the gate signals GS1 to GSm supplied to the gate lines G1 to Gm each have phases identical to the phase of the common voltage Vcom and can be swung to the second and third gate off voltages VOFF1 and VOFF2. The swing operation of the gate signals GS1 to GSm to the second and third gate off voltages VOFF1 and VOFF2 in the non-scan period will be described below in detail with reference to FIG. 4, FIG. 5, FIG. 6, FIG. 7, and FIG. 8.

According to an exemplary embodiment of the present invention, the gate driver 150 can be formed on a glass substrate that includes the display unit 110 using a thin film process.

Gate signals, which are swung between the second and third gate off voltages VOFF1 and VOFF2 with phases identical to the phase of the common voltage Vcom, are applied to the gate lines during the non-scan period. Therefore, the least voltage necessary to sustain the data can be maintained between the drain electrode ndata of the thin film transistor and the gate line. Thus, embodiments of the present invention may reduce the stress of the thin film transistor during the non-scan period.

Figure 4:
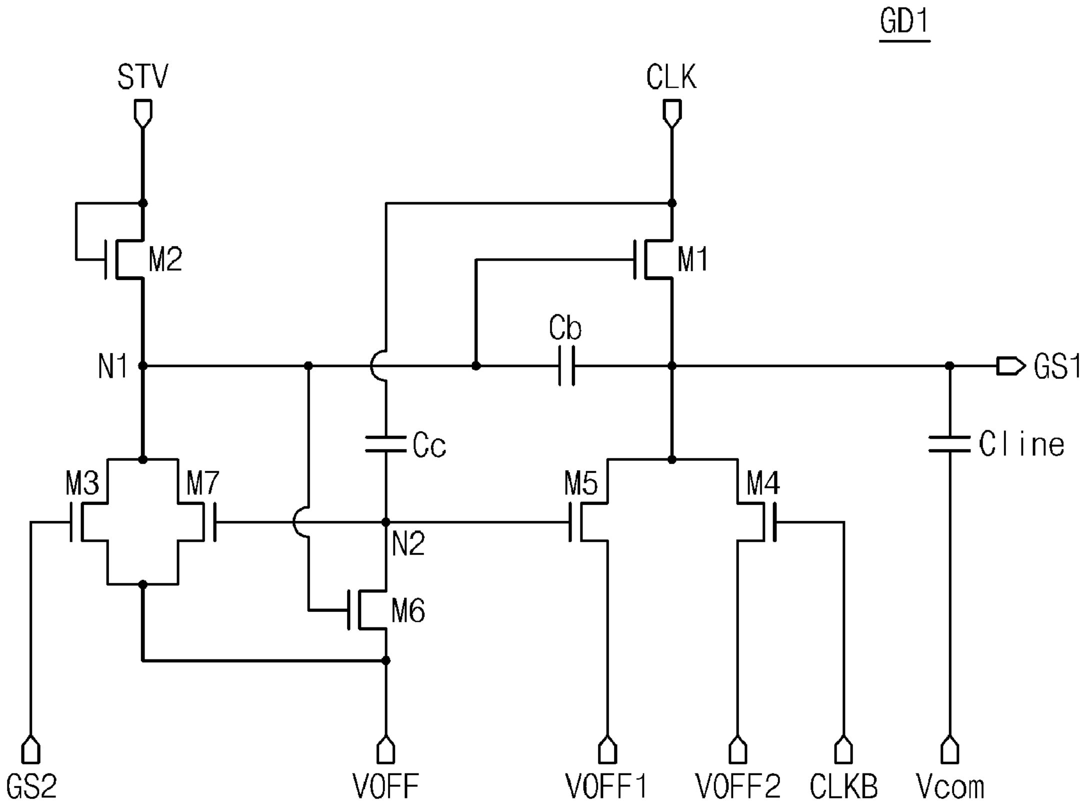
FIG. 4 is a circuit diagram showing an odd-numbered stage from among stages shown in FIG. 3.
Figure 5:
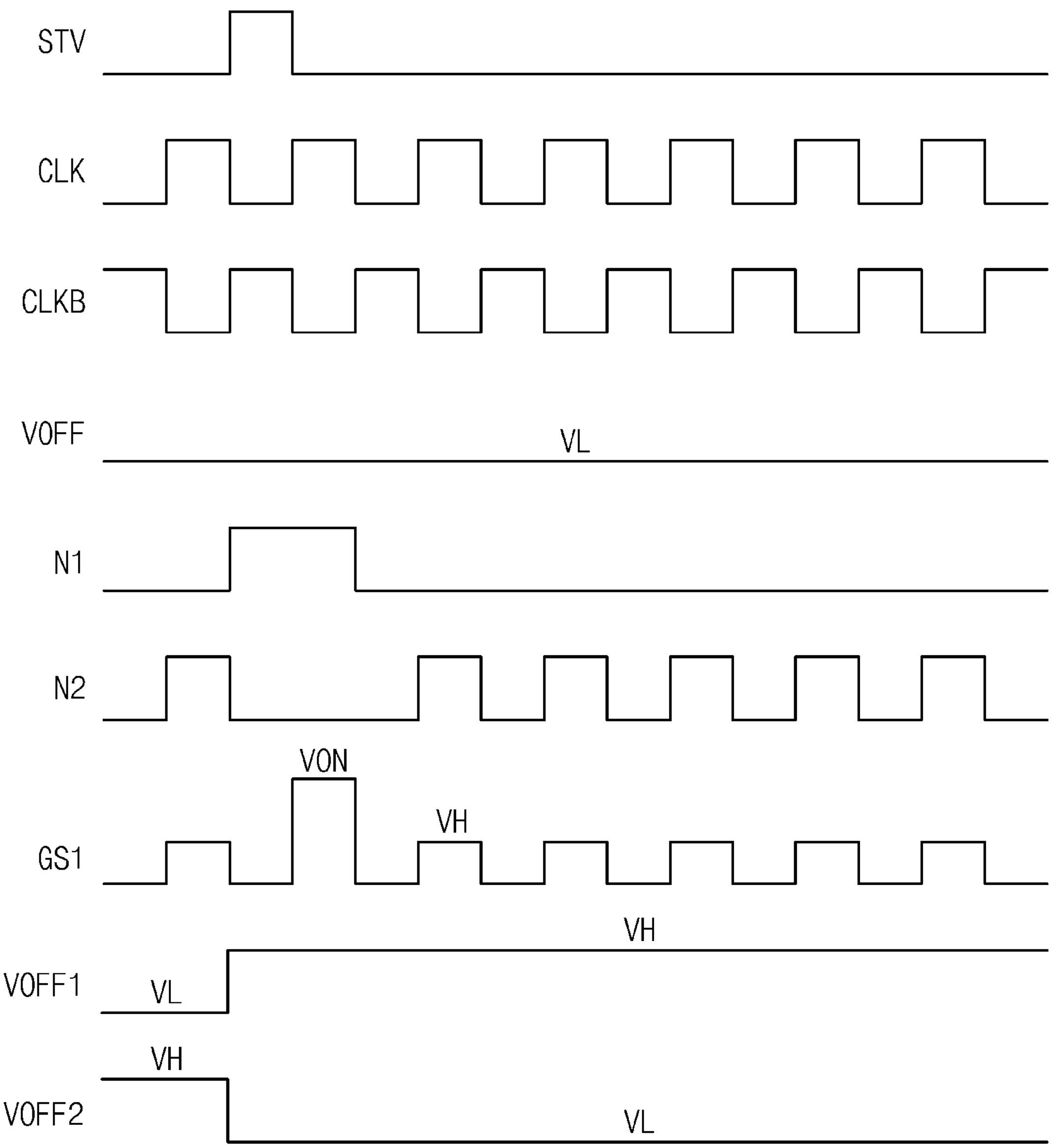
FIG. 5 is a waveform diagram showing input/output waveforms of the stage shown in FIG. 4.

FIG. 4 is a circuit diagram showing an odd-numbered stage from among stages shown in FIG. 3, and FIG. 5 is a waveform diagram showing input/output waveforms of the stage shown in FIG. 4. Since the odd-numbered stages all have the same circuit configuration, a first stage GD1 will be explained as an example with reference to FIG. 4, and a description of the other odd-numbered stages will be omitted in order to avoid redundancy.

Referring to FIG. 4, the first stage GD1 includes first to seventh MOS transistors M1, M2, M3, M4, M5, M6, and M7 and first to third capacitors Cb, Cc, and Cline.

The first MOS transistor M1 includes a source that receives the first clock signal CLK and a drain that outputs a gate signal GSk to gate line Gk. The second MOS transistor M2 includes a source that receives the gate signal GSk−1 or the vertical start signal STV, a drain connected to the first node N1, and a gate connected to the source. The third MOS transistor M3 includes a drain connected to the first node N1, a source connected to first gate off voltage VOFF, and a gate that receives the gate signal GSk+1. The fourth MOS transistor M4 includes a drain that outputs the gate signal GSk to the gate line Gk, a source to which the third gate off voltage VOFF2 is provided, and a gate that receives the second clock signal CLKB. The fifth MOS transistor M5 includes a drain that outputs the gate signal GSk to the gate line Gk, a source to which the second gate off voltage VOFF1 is provided, and a gate connected to the second node N2. The sixth MOS transistor M6 includes a drain connected to the second node N2, a source to which the first gate off voltage VOFF is provided, and a gate connected to the first node N1. The seventh MOS transistor M7 includes a drain connected to the first node N1, a source to which the first gate off voltage VOFF is provided, and a gate connected to the second node N2.

The first capacitor Cb is connected between the first node N1 and the gate line Gk that outputs the gate signal GSk. The second capacitor Cc is connected between the source of the first MOS transistor M1 and the second node N2. The third capacitor Cline is connected between the gate line Gk and the common voltage Vcom.

Referring to FIG. 4 and FIG. 5, the first gate off voltage VOFF is used to stabilize the first and second nodes N1 and N2. The first gate off voltage VOFF is maintained at a first voltage level VL.

The second and third gate off voltages VOFF1 and VOFF2 are used to change the off voltage level of the gate signal that is output to the gate line Gk in response to the first and second clock signals CLK and CLKB. In detail, the first stage GD1 outputs the second gate off voltage VOFF1 to the gate line Gk in response to the first clock signal CLK, and outputs the third gate off voltage VOFF2 to the gate line Gk in response to the second clock signal CLKB. The second gate off voltage VOFF1 is swung to the first voltage level VL or the second voltage level VH in synchronization with the common voltage Vcom, and the third gate off voltage VOFF2 is swung reversely to the second gate off voltage VOFF1. That is, when the second gate off voltage VOFF1 is swung to the first voltage level VL, the third gate off voltage VOFF2 is swung to the second voltage level VH. In an exemplary embodiment of the present invention, the second voltage level VH is higher than the first voltage level VL, and the voltage level of the second and third gate off voltages VOFF1 and VOFF2 is changed in a unit of one frame.

Hereinafter, the operation of the first stage GD1 will be explained with reference to Table 1.

TABLE 1

| N1 | CLK | CLKB | GS1 |
|---|---|---|---|
| L | H | L | VOFF1 |
| | L | H | VOFF2 |
| H | H | n/a | VON |
| | L | | VOFF |

Hereinafter, the operation of the first stage GD1 will be explained with reference to Table 1.

When the second MOS transistor M2 is turned on by the vertical start signal STV, the first node N1 becomes the high level, and the second node N2 becomes the low level. At this time, if the first clock signal CLK has the high level, the first MOS transistor M1 is turned on by the first clock signal CLK having the high level. As a result, the first stage GD1 outputs the first clock signal CLK having the high level as the first gate signal GS1. Thus, the first clock signal CLK having the high level is used as the gate on voltage VON of the first gate signal GS1.

If the first node N1 has a high level and the first clock signal CLK has a low level, the first and sixth MOS transistors M1 and M6 are turned on due to the first node N1 having the high level. At this time, the first stage GD1 outputs the first gate voltage VOFF as the first gate signal GS1 due to the coupling effect of the second capacitor Cc. Thus, the first gate signal GS1 has the first voltage level VL.

Meanwhile, if the first node N1 has a low level, the first clock signal CLK has a high level, and the second clock signal CLKB has a low level, the second node N2 is converted into the high level due to the coupling effect of the second capacitor Cc. Thus, the fifth MOS transistor M5 is turned on. As a result, the first stage GD1 outputs the second gate off voltage VOFF1 as the first gate signal GS1. At this time, the first gate signal GS1 has the first voltage level VL.

In addition, if the first node N1 has a low level, the first clock signal CLK has a low level, and the second clock signal CLKB has a high level, the fourth MOS transistor M4 is turned on due to the second clock signal CLKB having the high level. As a result, the first stage GD1 outputs the third gate off voltage VOFF2 as the first gate signal GS1. At this time, the first gate signal GS1 has the second voltage level VH.

Figure 6:
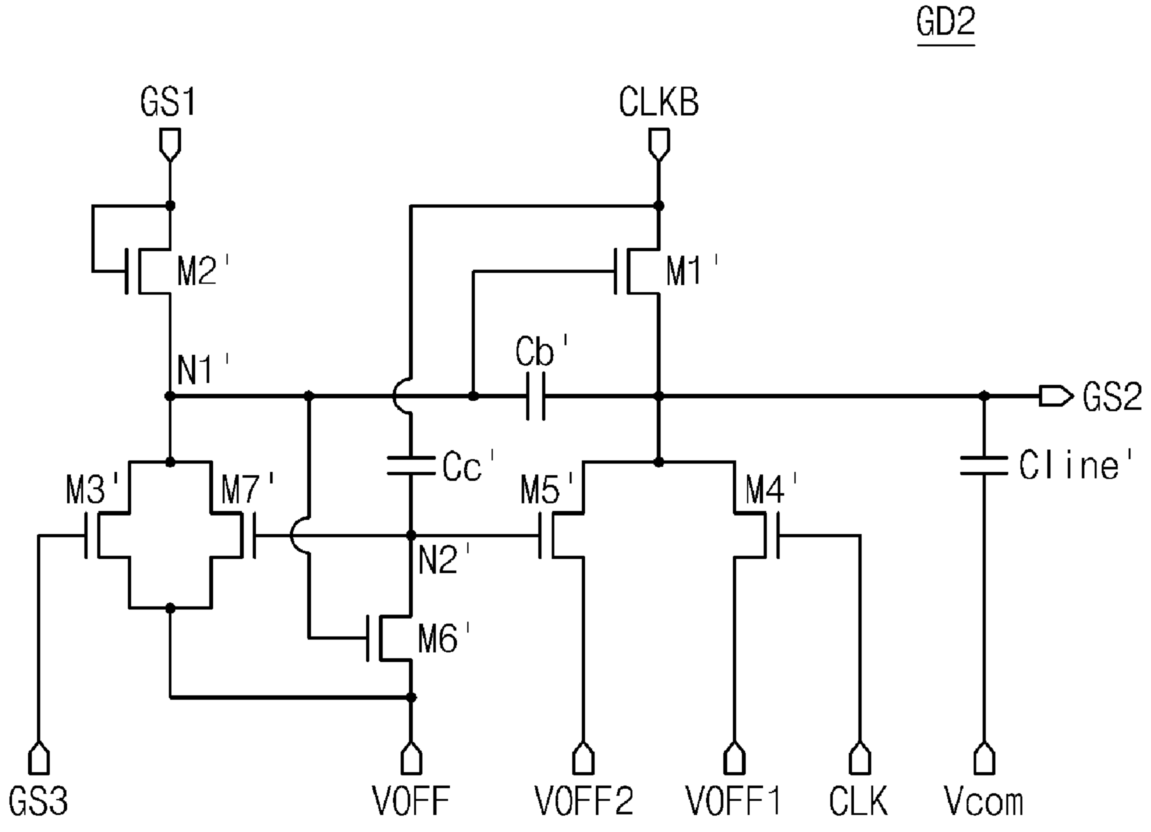
FIG. 6 is a circuit diagram showing an even-numbered stage from among stages shown in FIG. 3.
Figure 7:
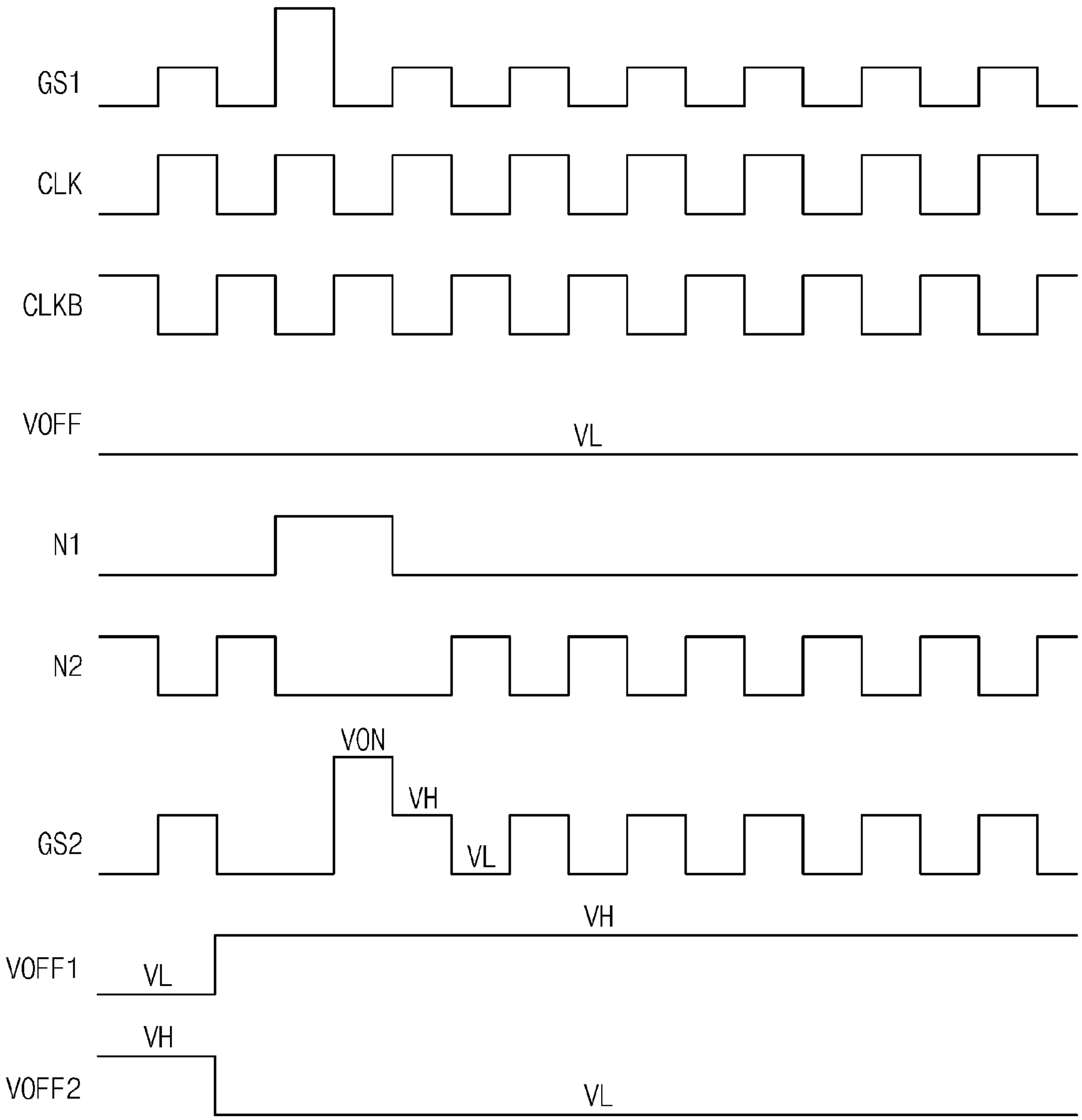
FIG. 7 is a waveform diagram showing input/output waveforms of the stage shown in FIG. 6.

FIG. 6 is a circuit diagram showing an even-numbered stage from among stages shown in FIG. 3, and FIG. 7 is a waveform diagram showing input/output waveforms of the stage shown in FIG. 6. Since the even stages all have the same circuit configuration, a second stage GD2 will be explained as an example with reference to FIG. 6, and a description of the other even stages will be omitted in order to avoid redundancy.

Referring to FIG. 6, the second input stage GD2 is similar to the first stage GD1 shown in FIG. 4 except for input positions of the first and second clock signals CLK and CLKB and the second and third gate off voltages VOFF1 and VOFF2.

Hereinafter, the operation of the second stage GD2 will be explained with reference to Table 2.

TABLE 2

| N1' | CLK | CLKB | GS2 |
|---|---|---|---|
| L | H | L | VOFF1 |
| | L | H | VOFF2 |
| H | n/a | L | VOFF |
| | | H | VON |

When the second MOS transistor M2' is turned on by the first gate signal GS1, the first node N1' becomes the high level, and the second node N2' becomes the low level. At this time, if the second clock signal CLKB has the high level, the first MOS transistor M1' is turned on by the second clock signal CLKB having the high level. As a result, the second stage GD2 outputs the second clock signal CLKB having the high level as the second gate signal GS2. Thus, the second clock signal CLKB having the high level is used as the gate on voltage VON of the second gate signal GS2.

If the first node N1' has a high level and the second clock signal CLKB has a low level, the first and sixth MOS transistors M1' and M6' are turned on due to the first node N1 having the high level. At this time, the second stage GD2 outputs the first gate voltage VOFF as the second gate signal GS2 due to the coupling effect of the second capacitor Cc'. Thus, the second gate signal GS2 has the first voltage level VL.

Meanwhile, if the first node N1' has a low level, the second clock signal CLKB has a high level, and the first clock signal CLK has a low level, the second node N2' is converted into the high level due to the coupling effect of the second capacitor Cc'. Thus, the fifth MOS transistor M5' is turned on. As a result, the second stage GD2 outputs the third gate off voltage VOFF2 as the second gate signal GS2. At this time, the second gate signal GS2 has the first voltage level VL.

In addition, if the first node N1' has a low level, the second clock signal CLKB has a low level, and the first clock signal CLK has a high level, the fourth MOS transistor M4' is turned on due to the first clock signal CLK having the high level. As a result, the second stage GD2 outputs the second gate off voltage VOFF1 as the second gate signal GS2. At this time, the second gate signal GS2 has the second voltage level VH.

Figure 8:
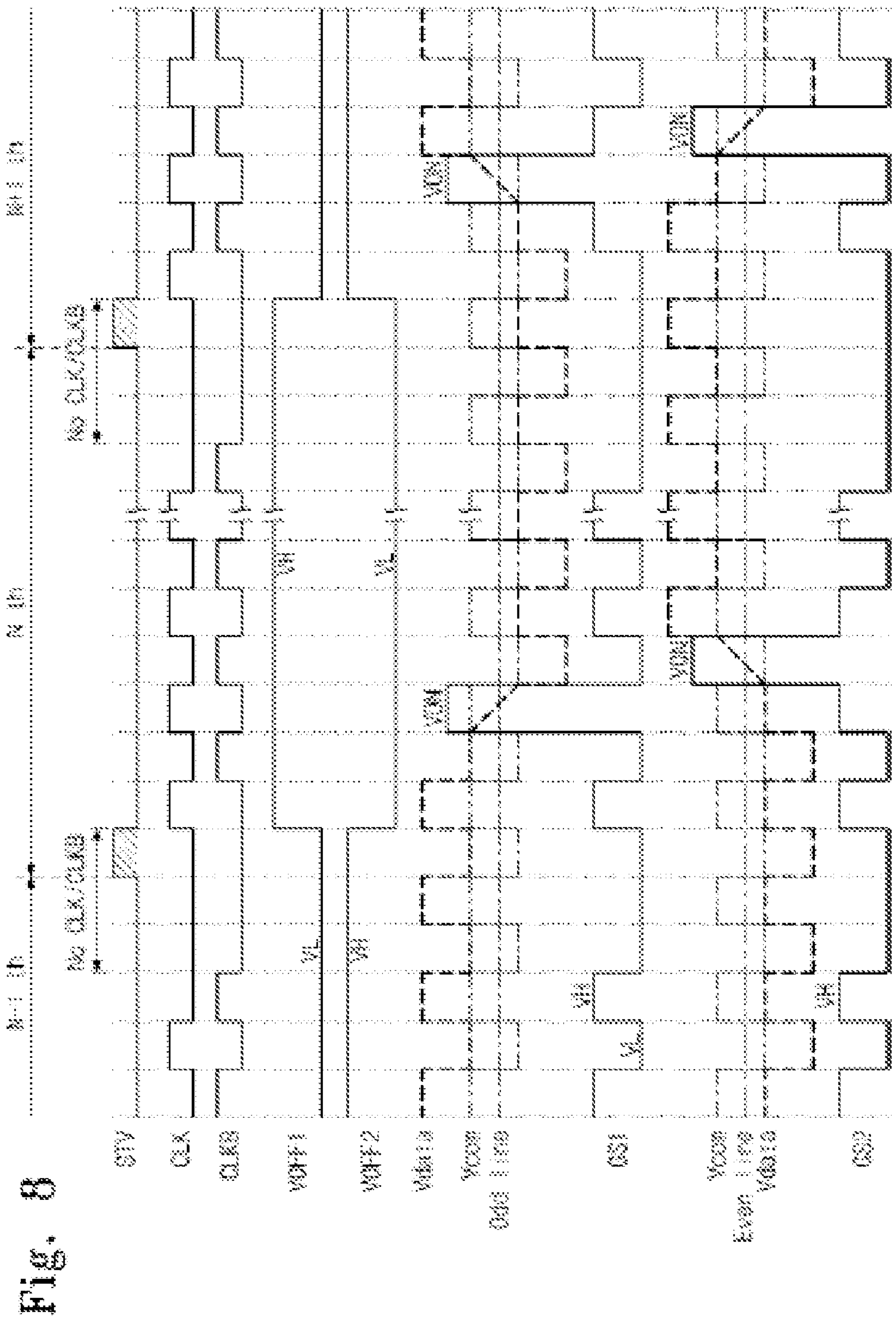
FIG. 8 is a waveform diagram showing waveforms of first and second gate signals in consecutive frames.

FIG. 8 is a waveform diagram showing waveforms of first and second gate signals in consecutive frames.

Referring to FIG. 8, data Vdata having negative polarity with respect to the common voltage Vcom are applied to the pixels connected to the first gate line G1 (see FIG. 2) in the $N^{th}$ frame. In addition, data Vdata having positive polarity with respect to the common voltage Vcom are applied to the pixels connected to the second gate line G2 (see FIG. 2) in the $N^{th}$ frame. In the $(N+1)^{th}$ frame, data Vdata having positive polarity with respect to the common voltage Vcom are applied to the pixels connected to the first gate line G1, and data Vdata having negative polarity with respect to the common voltage Vcom are applied to the pixels connected to the second gate line G2.

The second and third gate off voltages VOFF1 and VOFF2 are alternately output as the first and second gate signals GS1 and GS2 in synchronization with the common voltage during the non-scan period, except for the horizontal scan period (t) having the level of gate on voltage VON in one frame.

According to the LCD 100 of the present exemplary embodiment, a period having no first and second clock signals CLK and CLKB may exist in each frame.

As shown in FIG. 8, the first and second gate signals GS1 and GS2 are maintained at the first voltage level VL in a blank period of each frame. The first and second gate signals GS1 and GS2 may have the first voltage level VL or the second voltage level VH by the first and second clock signals CLK and CLKB, respectively.

During the blank period, the first and second gate signals GS1 and GS2 are maintained at the voltage level of the second gate off voltage VOFF1 or the third gate off voltage VOFF2, which is lately output, in the period having no first and second clock signals CLK and CLKB.

However, if the second clock signal is finished in the high level, the first clock signal CLK is output one more time. Thus, the first and second gate signals GS1 and GS2 can be maintained at the first voltage level in the period having no first and second clock signals CLK and CLKB.

Figure 9:
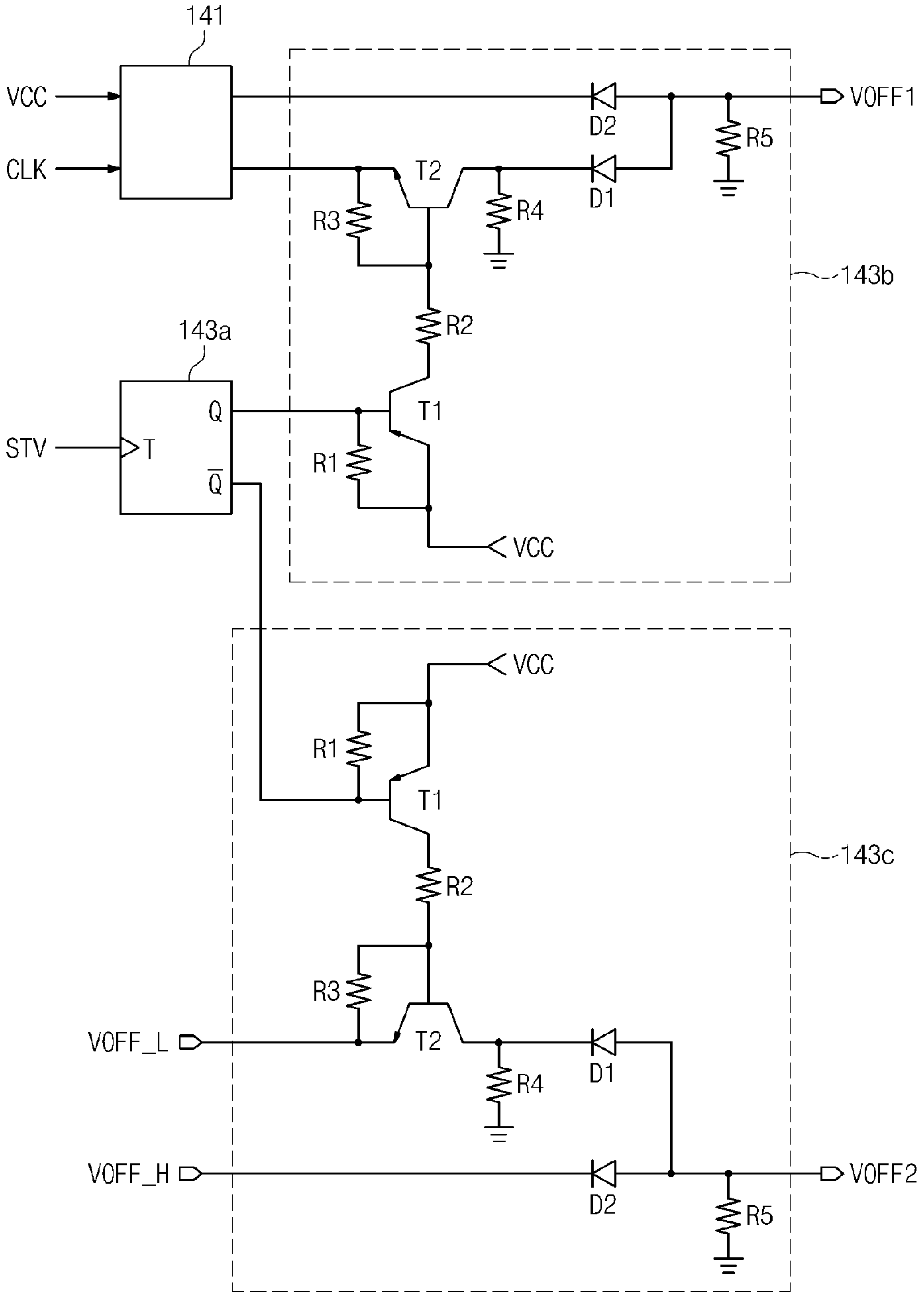
FIG. 9 is a circuit diagram showing a circuit that generates second and third gate off voltages in a gate off voltage generator shown in FIG. 1.
Figure 10:
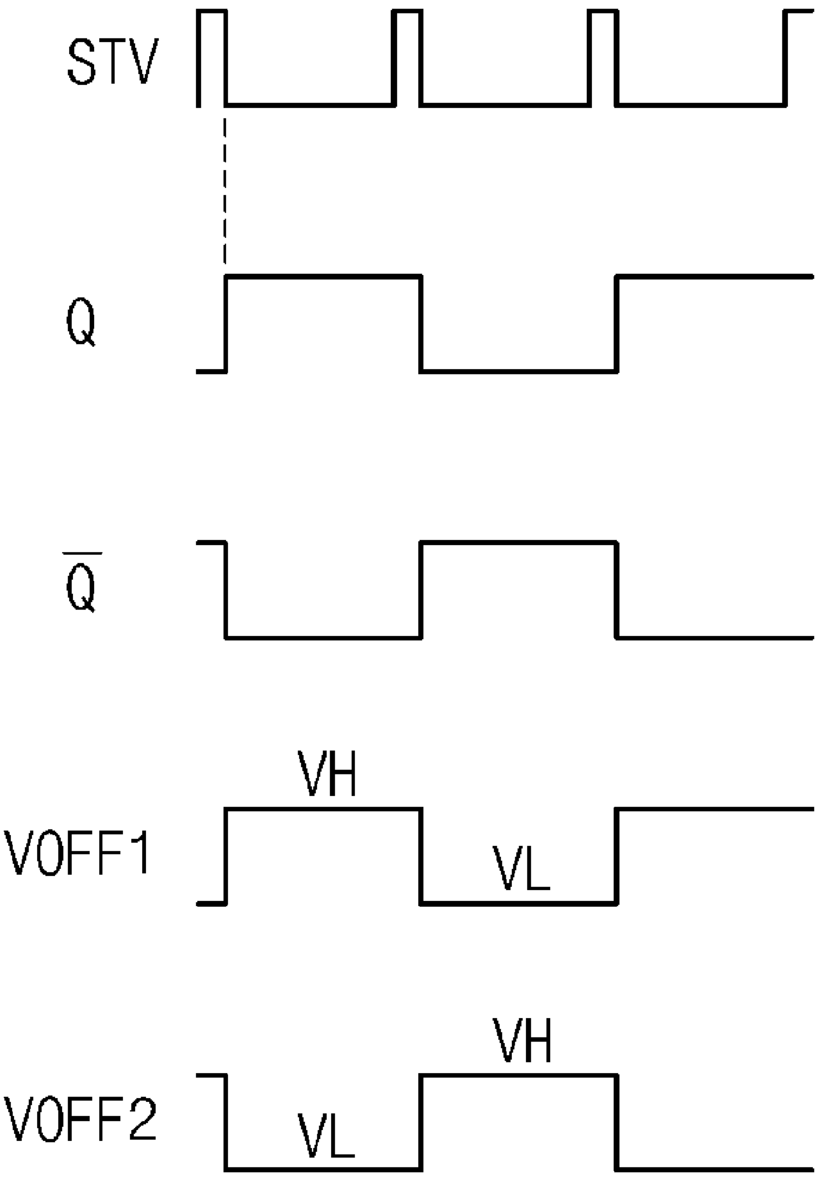
FIG. 10 is a waveform diagram showing waveforms of second and third gate off voltages shown in FIG. 9.

FIG. 9 is a circuit diagram showing a circuit that generates second and third gate off voltages in the gate off voltage generator 140 shown in FIG. 1, and FIG. 10 is a waveform diagram showing waveforms of second and third gate off voltages shown in FIG. 9.

Referring to FIG. 9, the gate off voltage generator 140 includes a first generator 141 that generates high off voltage Voff_H and low off voltage Voff_L, and a second generator that receives the high off voltage Voff_H and low off voltage Voff_L from the first generator 141 to generate the second and third gate off voltages VOFF1 and VOFF2.

The first generator 141 receives 3.3V driving voltage VCC and the clock signal CLK to generate the high off voltage VOFF_H and low off voltage VOFF_L having different voltage levels. The low off voltage VOFF_L has the first voltage level VOFF1 shown in FIG. 8, and the high off voltage VOFF_H has the second voltage level VOFF2 shown in FIG. 8.

The second generator 143 includes a flip-flop 143*a*, a second gate off voltage generator 143*b*, and a third gate off voltage generator 143*c*.

The flip-flop 143*a* receives the vertical start signal STV and changes the status of the signal output through first and second terminals Q and $\overline{Q}$ when the vertical start signal STV is converted into the low level.

As shown in FIG. 10, when the vertical start signal STV is converted into the low level, a high signal is output through the first terminal Q and a low signal is output through the second terminal $\overline{Q}$.

The second gate off voltage generator 143*b* is connected to the first terminal Q of the flip-flop 143*a* and the third gate off voltage generator 143*c* is connected to the second terminal $\overline{Q}$ of the flip-flop 143*a*. The second and third gate off voltage generators 143*b* and 143*c* have the same structure and functions.

Thus, the following description will be focused on the structure and functions of the second gate off voltage generator 143*b*, and details of the third gate off voltage generator 143*c* will be omitted.

The second gate off voltage generator 143*b* includes first and second transistors T1 and T2, first to fifth resistors R1, R2, R3, R4, and R5, and first and second diodes D1 and D2.

The first transistor T1 is turned on in response to the high signal output through the first terminal Q to output driving voltage VCC, and the second transistor T2 is turned on in response to the driving voltage VCC to generate the low off voltage VOFF_L. At this time, the first diode D1 is enabled, so that the low off voltage VOFF_L is output through the output terminal of the second gate off voltage generator 143*b*.

After that, the first and second transistors T1 and T2 are turned off in response to the low signal output through the first terminal Q. At this time, the second diode D2 is enabled, so that the high off voltage VOFF_H is output through the output terminal of the second gate off voltage generator 143*b*. Thus, the second gate off voltage generator 143*b* can generate the second gate off voltage VOFF1, which is swung between the high off voltage VOFF_H and the low off voltage VOFF_L in the period of two frames, based on the vertical start signal STV.

Meanwhile, the third gate off voltage generator 143*c* can generate the third gate off voltage VOFF2, which is swung between the high off voltage VOFF_H and the low off voltage VOFF_L in the period of two frames and has a phase reverse to the phase of the second gate off voltage VOFF1, through the above procedure.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display apparatus, comprising:

a display unit comprising a plurality of pixels arranged in pixel areas to display images;

a source driver to supply data voltages to the data lines, the data voltage corresponding to image data; and a gate driver to sequentially supply gate signals to the gate lines, wherein the gate signals are maintained at a level of a gate on voltage such that the data voltages of the data lines are supplied to corresponding pixels during a scan period, and alternately have a first voltage level and a second voltage level during a non-scan period, and wherein the gate driver receives a first gate off waveform, a second gate off waveform, and a third gate off waveform, in which the first gate off waveform is maintained at the first voltage level, and the second gate off waveform and the third gate off waveform alternate between the first voltage level and the second voltage level, the phase of the second gate off waveform and the phase of the third gate off waveform are reverse to each other.

2. The display apparatus of claim 1, wherein the display unit is operated through a line reverse drive scheme.

3. The display apparatus of claim 2, wherein a common voltage waveform alternately has positive polarity and negative polarity in a unit of one line and is applied to the display unit, and the gate driver receives a first clock signal and a second clock signal synchronized with the common voltage waveform, and the gate signals have a same shape as the common voltage waveform during the non-scan period.

4. The display apparatus of claim 3, wherein the gate driver comprises a plurality of stages that correspond to the gate lines in one to one correspondence to output the gate signal, and each stage alternately outputs the second gate off waveform and the third gate off waveform, as the gate signals, in synchronization with the first clock signal and the second clock signal during the non-scan period.

5. The display apparatus of claim 4, wherein odd-numbered stages of the stages output the second gate off waveform to corresponding odd-numbered gate lines in response to the first clock signal and output the third gate off waveform to the odd-numbered gate lines in response to the second clock signal, and wherein even-numbered stages of the stages output the second gate off waveform to corresponding even-numbered gate lines in response to the first clock signal and output the third gate off waveform to the even gate lines in response to the second clock signal, in which the first clock signal is a reverse phase signal of the second clock signal.

6. The display apparatus of claim 4, wherein a blank period exists between two adjacent frames, and the blank period comprises a period where the first clock signal and the second clock signal are not generated.

7. The display apparatus of claim 6, wherein the first voltage level is lower than the second voltage level, and each stage selectively outputs one of the second gate off waveform and the third gate off waveform that has the first voltage level to the corresponding gate line during the period where the first clock signal and the second clock signal are not generated.

8. The display apparatus of claim 1, wherein each of the second gate off waveform and the third gate off waveform has a period corresponding to two frames.

9. The display apparatus of claim 1, further comprising:

a gate off generator to generate the first gate off waveform, the second gate off waveform, and the third gate off waveform to supply the first gate off waveform, the second gate off waveform, and the third gate off waveform to the gate driver.

10. The display apparatus of claim 9, wherein the gate off generator comprises:

a first generator to generate a low off voltage that has the first voltage level and a high off voltage that has the second voltage level;

a second generator to receive the low off voltage and the high off voltage to generate the second gate off waveform, which has the first voltage level in an $N^{th}$ frame (N being a natural number) and the second voltage level in an $(N+1)^{th}$ frame in synchronization with a control signal, and the third gate off waveform having a phase reverse to a phase of the second gate off waveform.

11. The display apparatus of claim 10, wherein the control signal comprises a vertical start signal used to operate the gate driver, and levels of the second gate off waveform and the third gate off waveform are changed when the vertical start signal is converted from a high state to a low state.

12. The display apparatus of claim 1, wherein the gate driver is arranged on a substrate, on which the display unit is defined, through a thin film process.

13. A method of driving a display apparatus, the method comprising:

supplying data voltages to a plurality of data lines;

generating a first gate off waveform, a second gate off waveform, and a third gate off waveform;

sequentially supplying gate signals to a plurality of gate lines; and displaying images that correspond to the data voltages in response to the gate signals, wherein the gate signals are maintained at a level of a gate on voltage such that the data voltages of the data lines are supplied to corresponding pixels during a scan period, and alternately have a first voltage level and a second voltage level during a non-scan period, and wherein the first gate off waveform is maintained at the first voltage level, and the second gate off waveform and the third gate off waveform alternate between the first voltage level and the second voltage level, the phase of the second gate off waveform and the third gate off waveform are reverse to each other.

14. The method of claim 13, wherein a polarity of the data voltages is reversed in a unit of one gate line with respect to a common voltage waveform, and a polarity of the common voltage waveform is reversed in a unit of one line, and the gate signals have a same shape as the common voltage waveform during the non-scan period.

15. The method of claim 14, further comprising:

generating a first clock signal and second clock signal that are synchronized with the common voltage waveform.

16. The method of claim 15, wherein each of the second gate off waveform and the third gate off waveform has a period corresponding to two frames.

17. The method of claim 15, wherein the generating of the first gate off waveform, the second gate off waveform, and the third gate off waveform comprises:

generating a low off voltage that has the first voltage level and a high off voltage that has the second voltage level;

receiving the low off voltage and the high off voltage to generate the second gate off waveform, which has the first voltage level in an $N^{th}$ frame (N being a natural number) and the second voltage level in an $(N+1)^{th}$ frame in synchronization with a control signal, and the third gate off waveform having a phase reverse to a phase of the second gate off waveform.

18. The method of claim 17, wherein the control signal comprises a vertical start signal used to operate the gate driver, and levels of the second gate off waveform and the third gate off waveform are changed when the vertical start signal is converted from a high state to a low state.

19. The method of claim 15, wherein the second gate off waveform and the third gate off waveform are alternately output in synchronization with the first clock signal and the second clock signal during the non-scan period.

20. The method of claim 19, wherein the supplying of the gate signal comprises:

outputting the second gate off waveform to corresponding odd-numbered gate lines in response to the first clock signal and outputting the third gate off waveform to the odd-numbered gate lines in response to the second clock signal; and outputting the second gate off waveform to corresponding even-numbered gate lines in response to the first clock signal and outputting the third gate off waveform to the even-numbered gate lines in response to the second clock signal, in which the first clock signal is a reverse phase signal of the second clock signal.

21. The method of claim 19, wherein a blank period exists between two adjacent frames, and the blank period comprises a period where the first clock signal and the second clock signals are not generated.

22. The method of claim 21, wherein the first voltage level is lower than the second voltage level, and the gate signal has the first voltage level during the period where the first clock signal and the second clock signal are not generated.

* * * * *